United States Patent [19]
Drabek

[11] 3,929,817
[45] Dec. 30, 1975

[54] DITHIOPHOSPHORIC ACID ESTERS
[75] Inventor: Jozef Drabek, Allschwil, Switzerland
[73] Assignee: Ciba-Geigy Corporation, Ardsley, N.Y.
[22] Filed: Sept. 22, 1972
[21] Appl. No.: 291,494

[30] Foreign Application Priority Data
Sept. 28, 1971 Switzerland............... 14157/71
July 25, 1972 Switzerland............... 11112/72

[52] U.S. Cl............. 260/307 C; 260/304; 260/306; 424/200
[51] Int. Cl.² ............C07D 263/58; C07D 277/68; C07D 277/70
[58] Field of Search................. 260/307 C, 304, 306

[56] References Cited
UNITED STATES PATENTS
2,984,669  5/1961  Brahler et al. ................. 260/307 C
3,668,213  6/1972  Jamison ......................... 260/307 C Primary Examiner—Richard J. Gallagher
Attorney, Agent, or Firm—Frederick H. Rabin; Harry Falber

[57] ABSTRACT
Dithiophosphoric acid esters are provided having the formula

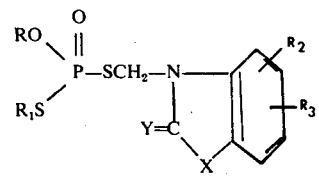

wherein
R is methyl or ethyl
$R_1$ is $C_3$–$C_5$ alkyl optionally interrupted by O, S, NH
$R_2$ and $R_3$ are independently of each other hydrogen, halogen, $C_1$–$C_4$ alkyl or $NO_2$
X and Y are independently of each other, oxygen or sulphur
which compounds may be used as pesticides, in particular insecticides, acaricides, nematocides and fungicides.

13 Claims, No Drawings

DITHIOPHOSPHORIC ACID ESTERS

This invention relates to S-(2-oxo- or S-(2-thiono-3-methylene-benzoxazole)dithiophosphoric acid esters, and the equivalent benzthiazoles, their manufacture and their use for pest control.

According to the present invention, there are provided compounds of the formula

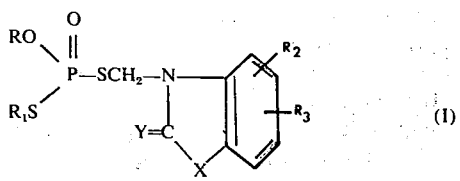

wherein:
R is methyl or ethyl;
$R_1$ is $C_3-C_5$ alkyl optionally interrupted by O, S or NH;
$R_2$ and $R_3$ are independently of each other hydrogen, halogen, $C_1-C_4$ alkyl or $NO_2$, and
X and Y are independently of each other oxygen or sulphur.

By halogen is meant fluorine, chlorine, bromine or iodine.

The alkyl groups for $R_1$ to $R_3$ may be straight or branched chain, substituted or unsubstituted and optionally interrupted by O, S or NH. These groups preferably have 1 to 5 carbon atoms in the chain. As substituents there are, for example halogen, hydroxyl and cyano. Examples of such groups include: methyl, trifluoromethyl, methoxyethyl, ethyl, ethoxyethyl, cyanoethyl, propyl, isopropyl, n-, i-, sec- and tert-butyl and n-pentyl.

On account of their activity, especially preferred are compounds of formula I wherein
R is methyl or ethyl;
$R_1$ is propyl, isopropyl, n-, i-, sec-, or tert-butyl, n-pentyl, optionally interrupted by oxygen or sulphur,
$R_2$ and $R_3$ are independently of each other hydrogen or halogen;
X is oxygen and
Y is oxygen or sulphur.

The compounds of formula I can be made by the following known method:

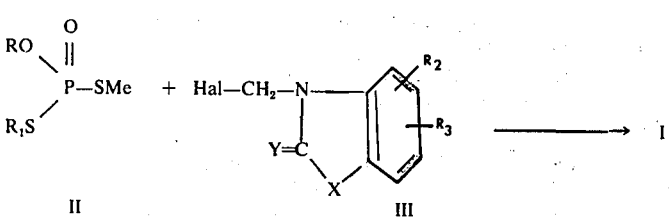

In formulae II and III, R, $R_1$, $R_2$, $R_3$ and Y have the meanings given form formula I, Hal stands for halogen, particularly chlorine or bromine and Me means an alkali metal, particularly sodium, potassium, ammonium or alkylammonium. The process is carried out at a reaction temperature between 0° and 100°C at normal pressure and in solvents or diluents inert to the reactants.

Suitable as inert solvents or diluents are, for example, ethers and ethereal compounds such as diethyl ether, dipropyl ether, dioxane, tetrahydrofuran; amides such as N, N-dialkylated carboxylic acid amides; aliphatic, aromatic and halogenated hydrocarbons, particularly benzene, toluene, xylene, chlorobenzene; nitriles such as acetonitrile; DMSO.

The starting materials of formula I and II are partly known or can be made by methods known per se.

The compounds of formula I have a broad biocidal activity spectrum and can be used for combating various animal and vegetable pests.

Particularly they have insecticidal and acaricidal properties and can be used against all development stages, e.g. eggs, larvae, pupae, nymphs and adults of insects and representatives of the family Acarina, for example against insects of the families: Teltigonidae, Gryllidae, Gryllotalpidae, Blattidae, Peduviidae, Phyrrhocoriae, Cimicidae, Delphacidae, Aphididae, Diaspididae, Pseudococcidae, Scarabacidae, Dermestidae, Coccinellidae, Tenebrionidae, Chrysomelidae, Bruchidae, Tineidae, Noctuidae, Lymatriidae, Pyralidae, Culcidae, Tripulidae, Stomoxydae, Trypetidae, Muscidae, Calliphoridae and Pulicidae, as well as Akarida of the families Ixodidae, Argasidae, Tetranychidae and Dermanyssidae.

The insecticidal or acaricidal action can be substantially broadened and matched to give circumstances by the addition of other insecticides and/or acaricides.

As additives there are suitable for example the following active substances.

Organic phosphorus compounds

Bis- O,O-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-(dimethoxyphosphinyloxy)-N,N-dimethyl-cis-crotonamide(DICROTOPHOS)
2-chloro-2-diethylcarbamoyl-1-methylvinyldimethylphosphate (PHOSPHAMIDON)
O,O-diethyl-O(or S)-2-(ethylthio)-ethylthiophosphate (DEMETON)
S-ethylthioethyl-O,O-dimethyl-dithiophosphate (THIOMETON)
O,O-diethyl-S-ethylmercaptomethyldithiophosphate (PHORATE)
O,O-diethyl-S-2-ethylthio)ethyldithiophosphate (DISULFOTON)
O,O-dimethyl-S-2-(ethylsulphinyl)ethylthiophosphate (OXYDEMETONMETHYL)

O,O-dimethyl-S-(1,2-dicarbethoxyethyldithiophosphate (MALATHION)
O,O,O,O-tetraethyl-S,S'-methylene-bis-dithiophosphate (ETHION)
O-ethyl-S,S-dipropyldithiophosphate
O,O-dimethyl-S-(N-methyl-N-formylcarbamoylmethyl)-dithiophosphate (FORMOTHION)
O,O-dimethyl-S-(N-methylcarbamoylmethyl)dithiophosphate (DIMETHOATE)
O,O-dimethyl-O-p-nitrophenylthiophosphate (PARATHION-METHYL)
O,O-diethyl-O-p-nitrophenylthiophosphate (PARATHION)
O-ethyl-O-p-nitrophenylphenylthiophosphate (EPN)
O,O-dimethyl-O-(4-nitro-m-tolyl)thiophosphate (FENITROTHION)
O,O-dimethyl-O-2,4-5-trichlorophenylthiophosphate (RONNEL)
O-ethyl-0,2,4,5-trichlorophenylethylthiophosphate (TRICHLORONATE)
O,O-dimethyl-0-2,5-dichloro-4-bromophenylthiophosphate (BROMOPHOS)
O,O-dimethyl-O-(2,5-dichloro-4-jodphenyl)-thiophosphate (IODOFENPHOS)
4-tert. butyl-2-chlorophenyl-N-methyl-O-methylamidophosphate (CRUFOMATE)
O,O-dimethyl-O-(3-methyl-4-methylmercaptophenyl)-thiophosphate (FENTHION)
Isopropylamino-O-ethyl-O-(4-methylmercapto-3-methylphenyl)-phosphate
O,O-diethyl-O-p-(methylsulphinyl)phenyl-thiophosphate (FENSULFOTHION)
O-p-(dimethylsulphamido)phenyl-O,O-dimethylthiophosphate (FAMPHUR)
O,O,O'.O'-tetramethyl-0,0'-thiodi-p-phenylenethiophosphate
O-ethyl-S-phenyl-ethyldithiophosphate
O,O-dimethyl-O-(α-methylbenzyl-3-hydroxycrotonyl)-phosphate
2-chloro-1-(2,4-dichlorophenyl)vinyl-diethylphosphate (CHLORFENVINPHOS)
1-chloro-1-(2,4,5-trichlorophenyl)vinyl-dimethylphosphate
O-[2-chloro-1-(2,5-dichlorophenyl)]vinyl-O,O-diethylthiophosphate
Phenylglyoxylonitriloxim-O,O-diethylthiophosphate (PHOXIM)
O,O-diethyl-O-(3-chloro-4-methyl-2-oxo-2-H-1-benzopyran-7-yl)-thiophosphate (COUMAPHOS)
2,3-p-dioxandithiol-S,S-bis(O,O-diethyldithiophosphate) (DIOXANTHION)
5-[(6-chloro-2-oxo-3-benzoxazolinyl)methyl]O,O-diethyldithiophosphate (PHOSALONE)
2-(diethoxyphosphinylimino)-1,3-dithiolane
O,O-dimethyl-S-[2-methoxy-1,3,4-thiadiazol-5-(4H)-onyl-(4)-methyl]dithiophosphate
O,O-dimethyl-S-phthalimidomethyl-dithiophosphate (IMIDAN)
O,O-diethyl-O-(3,5,6-trichloro-2-pyridyl)thiophosphate
O,O-diethyl-O-2-pyrazinylthiophosphate (THIONAZIN)
O,O-diethyl-O-(2-isopropyl-4-methyl-6-pyrimidyl)thiophosphate (DIAZINON)
O,O-diethyl-O-(2-chinoxalyl)thiophosphate
O,O-dimethyl-S-(4-oxo-1,2,3-benzotriazin-3(4H)-ylmethyl)dithiophosphate (AZINPHOSMETHYL)
O,O-diethyl-S-(4-oxo-1,2,3-benzotriazin-3(4H)-ylmethyl)dithiophosphate (AZINPHOSETHYL)
S-[(4,6-diamino-s-triazin-2-yl)methyl]-O,O-dimethyldithiophosphate (MENAZON)
O,O-dimethyl-O-(3-chloro-4-nitrophenyl)thiophosphate (CHLORTHION)
O,O-dimethyl-O(or S)-2-(ethylthioethyl)thiophosphate (DEMETON-S-METHYL)
2-(O,O-dimethyl-phosphoryl-thiomethyl)-5-methoxy-pyron-4-3,4-dichlorobenzyl-triphenylphosphoniumchloride
O,O-diethyl-S-(2,5-dichlorophenylthiomethyl)dithiophosphate (PHENKAPTON)
O,O-diethyl-O-(4-methyl-cumarinyl-7-)-thiophosphate (POTASAN)
5-amino-bis(dimethylamido)phosphinyl-3-phenyl-1,2,4-triazole (TRIAMIPHOS)
N-methyl-5-(O,O-dimethylthiolphosphoryl)-3-thiavaleramide (VAMIDOTHION)
O,O-diethyl-O-[2-diemthylamino-4-methylpyrimidyl-(6)]-thiophosphate (DIOCTHYL)
O,O-dimethyl-S-(methylcarbamoylmethyl)-thiophosphate (OMETHOATE)
O-ethyl-O-(8-quinolinyl)-phenylthiophosphonate (OXINOTHIOPHOS)
O-methyl-S-methyl-amidothiophosphate (MONITOR)
O-methyl-O-(2,5-dichloro-4-bromophenyl)-benzothiophosphate (PHOSVEL)
O,O,O,O-tetrapropyldithiophosphate
3-(dimethoxyphosphinyloxy)-N-methyl-N-methoxy-cis-crotonamide
O,O-diemthyl-S-(N-ethylcarbamoylmethyl)dithiophosphate (ETHOATE-METHYL)
O,O-diethyl-S-(N-isopropylcarbamoylmethyl)-dithiophosphate (PROTHOATE)
S-N-(1-cyano-1-methylethyl)carbamoylmethyldiethyl-thiolphosphate (CYANTHOATE)
S-(2-acetamidoethyl)-O,O-dimethyldithiophosphate
Hexamethylphosphoric acid triamide (HEMPA)
O,O-dimethyl-O-(2-chloro-4-nitrophenyl)thiophosphate (DICAPTHON)
O,O-dimethyl-O-p-cyanophenyl thiophosphate (CYANOX)
O-ethyl-O-p-cyanophenylthiophosphonate
O,O-diethyl-O-2,4-dichlorophenylthiophosphate (DICHLORFENTHION)
O,2,4-dichlorophenyl-O-methylisopropylamidothiophosphate
O,O-diethyl-O-2,5-dichloro-4-bromophenylthiophosphate (BROMOPHOS-ETHYL)
Dimethyl-p-(methylthio)phenylphosphate
O,O-dimethyl-O-p-sulfamidophenylthiophosphate
O-[p-(p-chlorophenyl)azophenyl]O,O-dimethylthiophosphate (AZOTHOATE)
O-ethyl-S-4-chlorophenyl-ethyldithiophosphate
O-isobutyl-S-p-chlorophenyl-ethyldithiophosphate
O,O-dimethyl-S-p-chlorophenylthiophosphate
O,O-dimethyl-S-(p-chlorophenylthiomethyl)dithiophosphate
O,O-diethyl-p-chlorophenylmercaptomethyl-dithiophosphate (CARBOPHENOTHION)
O,O-diethyl-S-p-chlorophenylthiomethyl-thiophosphate
O,O-dimethyl-S-(carbethoxy-phenylmethyl)dithiophosphate (PHENTHOATE)
O,O-diethyl-S-(carbofluorethoxy-phenylmethyl)-dithiophosphate O,O-dimethyl-S-carboisopropoxy-phenylmethyl)-dithiophosphate
O,O-diethyl-7-hydroxy-3,4-tetramethylene-coumarinyl-thiophosphate (COUMITHOATE)
2-methoxy-4-H-1,3,2-benzodioxaphosphorin-2-sulphide
O,O-diethyl-O-(5-phenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chloro-1-phthalimidoethyl)-O,O-diethyldithiophosphate
N-hydroxynaphthalimido-diethylphosphate
Dimethyl-3,5,6-trichloro-2-pyridylphosphate
O,O-dimethyl-O-(3,5,6-trichloro-2-pyridyl)thiophosphate
S-2-(ethylsulphonyl)ethyl dimethylthiolphosphate (DIOXYDEMETONS-S-METHYL)
Diethyl-S-2-(ethylsulphinyl)ethyl dithiophosphate (OXIDISULFOTON)
Bis-O,O-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphonate (BUTONATE)
O,O-dimethyl-O-(2,2-dichloro-1-methoxy-vinyl)phosphate
Bis-(dimethylamido)fluorphosphate (DIMEFOX)
3,4-dichlorobenzyl-triphenylphosphoniumchloride
Dimethyl-N-methoxymethylcarbamoylmethyl-dithiophosphate (FORMOCARBAM)
O,O-diethyl-O-(2,2-dichloro-1-chloroethoxyvinyl)-phosphate
O,O-dimethyl-O-(2,2-dichloro-1-chloroethoxyvinyl)-phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (METHYLCARBOPHENOTHION)
O,O-dimethyl-S-(ethylthiomethyl)dithiophosphate
Diisopropylaminofluorophosphate (MIPAFOX)
O,O-dimethyl-S-(morpholinylcarbamoylmethyl)dithiophosphate (MORPHOTHION)
Bismethylamido-phenylphosphate
O,O-dimethyl-S-(benzene sulphonyl)dithiophosphate
O,O-dimethyl-(S and O) -ethylsulphinylethylthiophosphate
O,O-diethyl-O-4-nitrophenylphosphate
Triethoxy-isopropoxy-bis(thiophosphinyl)disulphide
2-methoxy-4H-1,3,2,benzodioxaphosphorin-2-oxide
Octamethylpyrophosphoramide (SCHRADAN)
Bis (dimethoxythiophospphinylsulphido)-phenylmethane
N,N,N',N'-tetramethyldiamidofluorophosphate (DIMEFOX)
O-phenyl-O-p-nitrophenyl-methanthiophosphonate (COLEP)
O-methyl-O-(2-chloro-4-tert.butyl-phenyl)-N-methylamidothiophosphate (NARLENE)
O-ethyl-O-(2,4-dichlorophenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide
O,O-di-(β-chloroethyl)-O-(3-chloro-4-methylcoumarinyl-7)-phosphate
S-(1-phthalimidoethyl)-O,O-diethyldithiophosphate
O,O-dimethyl-O-(3-chloro-4-diethylsulphamylphenyl)-thiophosphate
O-methyl-O-(2-carbisopropoxyphenyl)-amidothiophosphate
5-(O,O-dimethylphosphoryl)-6-chloro-bicyclo(3.2.0)-heptadiene (1,5)
O-methyl-O-(2-i-propoxycarbonyl-1-methylvinyl)-ethylamidothiophosphate.

Nitrophenols & Derivatives 4,6-Dinitro, 6-methylphenol, Na-salt (dinitrocresol)
Dinitrobutylphenol (2,2',2" triethanolamine salt)
2 cyclohexyl-4,6-dinitrophenol (dinex)
2-(1-methylheptyl)-4,6-dinitrophenyl-crotonate (dinocap)
2 sec.-butyl-4,6-dinitrophenyl-3-methyl-butenoate (binapacryl)
2 sec.-butyl-4,6-dinitrophenyl-cyclopropionate
2 sec.-butyl-4,6-dinitrophenyl-isopropyl-carbonate (dinobuton)

Miscellaneous pyrethin I
pyrethin II
3-allyl-2-methyl-4-oxo-2-cyclopentan-1-yl-chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide [Chlorobensid]
6-methyl-2-oxol, 3-dithiolo-[4,5-b]-quinoxaline (Quinomethionate)
(I)-3-(2-furfuryl)-2-methyl-4-oxocyclopent-2-enyl(I)-(cis+trans)-chrysanthemum-monocarboxylate [Furethrin]
2-pivaloyl-indane-1,3-dione [Pindon]
N'-(4-chloro-2-methylphenyl)-N,N-dimethylformamidine [Chlorophenamidin]
4-chlorobenzyl-4-fluorophenyl-sulphide [Fluorobenside]
5,6-dichloro-1-phenoxycarbanyl-2-trifluoromethylbenzimidazole [Fenozaflor]
p-chlorophenyl-p-chlorobenzenesulphonate [Ovex]
p-chlorophenyl-benzenesulphonate [Fenson]
p-chlorophenyl-2,4,5-trichlorophenylsulphone [Tetradifon]
p-chlorophenyl-2,4,5-trichlorophenylsulphide [Tetrasul]
p-chlorobenzyl-p-chlorophenylsulphide (chlorobenside)
2-thio-1,3-dithiolo-(,5-6)-quinoxaline (thioquinox)
prop-2-ynyl-(4-t-butylphenoxy)-cyclohexylsulphite (propargil)

Formamidines 1-dimethyl-2-(2'-methyl-4'-chlorophenyl)-formamidine (CHLORPHENAMIDIN)
1-methyl-2-(2'-methyl-4'-chlorophenyl)-formamidine
1-methyl-2-(2'-methyl-4'-bromophenyl)-formamidine
1-methyl-2-(2',4'-dimethylphenyl)-formamidine
1-n-butyl-1-methyl-2-(2'-methyl-4'-chlorophenyl)-formamidine 1-methyl-1-(2'-methyl-4'-chloroaniline-methylene)-formamidine
2-(2''-methyl-4''-chlorophenyl)-formamidine
1-n-butyl-2-(2'-methyl-4'-chlorophenyl-imino)-pyrolidine.

Urea

N-2-methyl-4-chlorophenyl-N',N'-dimethyl-thiourea.

Carbamates 1-naphthyl-N-methyl carbamate (CARBARYL)
2-butinyl-4-chlorophenyl carbamate
4-dimethylamino-3,5-xylyl-N-methylcarbamate
4-dimethylamino-3-tolyl-N-methylcarbamate (AMINOCARB)
4-methylthio-3,5-xylyl-N-methylcarbamate (METHIOCARB)
3,4,5-trimethylphenyl-N-methylcarbamate
2-chlorophenyl-N-methyl carbamate (CPMC)
5-chloro-6-oxo-2-norbonan-carbonitril-O-(methyl-carbamoyl)oxime
1-(dimethylcarbamoyl)-5-methyl-3-pyrazolyl-N,N-dimethyl carbamate (DIMETILAN)
2,3-dihydro-2,2-dimethyl-7-benzofuranyl-N-methyl carbamate (CARBOFURAN)
2-methyl-2-methylthio-propionaldehyde-O-(methyl carbamoyl)-oxime (ALDICARB)
8-Quinaldyl-N-methylcarbamate and its salts
Methyl 2-isopropyl-4-(methylcarbamoyloxy)carbanilate
m-(1- ethylpropyl)phenyl-N-methylcarbamate
3,5-Di-tert. butyl-N-methylcarbamate
m-(1-Methylbutyl)phenyl-N-methylcarbamate
2-Isopropylphenyl-N-methylcarbamate
2-sec. Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (PROMECARB)
3,5-Diisopropylphenyl-N-methylcarbamate
2-Chlor-5-isopropylphenyl-N-methylcarbamate
2-Chlor-4,5-dimethylphenyl-N-methylcarbamate
2-(1,3-Dioxolan-2-yl)phenyl-N-methylcarbamate (DIOXACARB)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropyoxyphenyl-N-methylcarbamate (ARPROCARB)
2-(2-Propinyloxy)phenyl-N-methylcarbamate
3-(2-Propinyloxy)phenyl-N-methylcarbamate
2-Dimethylaminophenyl-N-methylcarbamate
2-Diallylaminophenyl-N-methylcarbamate
4-Diallylamino-3,5-xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2-Dimethylamino-5,6-dimethylpyrimidin-4-yl-N,N-dimethylcarbamate
3-Methyl-4-dimethylaminomethylenimiophenyl-N-methylcarbamate-3,4-dimethylphenyl-N-methylcarbamate-2-cyclopentyl-N-methylcarbamate
3-Dimethylamino-methyleniminophenyl-N-methylcarbamate (FORMETANATE) and its salts
1-Methylthio-ethylimino-N-methylcarbamate (METHOMYL)
2-Methylcarbamoyloximino-1,3-dithiolane
5-Methyl-2-methylcarbamoyloximino-1,3-oxythiolane
2-(1-Methoxy-2-propoxy)phenyl-N-methylcarbamate
2-(1-Butin-3-yl-oxy)phenyl-N-methylcarbamate
1-Dimethylcarbamyl-1-methylthio-O-methylcarbamyl-formoxime
1-(2'-Cyanoethylthio)-O-methylcarbamyl-acetaldoxime
1-Methylthio-O-carbamyl-acetaldoxime
O-(3-sec.-Butylphenyl)-N-phenylthio-N-methylcarbamate
2,5-Dimethyl-1,3-dithiolan-2-(O-methylcarbamyl)-aldoxime
O-2-Diphenyl-N-methylcarbamate
2-(N-Methylcarbamyl-oximino)-3-chlor-bicyclo[2.2.1]heptane
2-(N-Methylcarbamtl-oximino)-bicyclo[2.2.1]heptane
3-Isopropylphenyl-N-methyl-N-chloracetyl-carbamate
3-Isopropylphenyl-N-methyl-N-methylthiomethyl-carbamate
O-(2,2-Dimethyl-4-chlor-2,3-dihydro-7-benzofuranyl)-N-methylcarbamate
O-(2,2,4-Trimethyl-2,3-dihydro-7-benzofuranyl)-N-methylcarbamate
O-Naphthyl-N-methyl-N-acetyl-carbamate
O-5,6,7,8-Tetrahydronaphthyl-N-methylcarbamate
3-Isopropyl-4-methylthio-phenyl-N-methylcarbamate
3,5-Dimethyl-4-methoxy-phenyl-N-methylcarbamate
3-Methoxymethoxy-phenyl-N-methylcarbamate
3-Allyloxyphenyl-N-methylcarbamate
2-Propargyloxymethoxy-phenyl-N-methylcarbamate
2-Allyloxyphenyl-N-methycarbamate
4-Methoxycarbonylamino-3-isopropylphenyl-N-methylcarbamate
3,5-Dimethyl-4-methoxycarbonylamino-phenyl-N-methylcarbamate
2-γ-Methylthiopropylphenyl-N-methylcarbamate
3-(α-Methoxymethyl-2-propenyl)-phenyl-N-methylcarbamate
2-Chlor-5-tert-butyl-phenyl-N-methylcarbamate
4-(Methyl-propargylamino)-3,5-xylyl-N-methylcarbamate
4-(Methyl-γ-chlorallylamino)-3,5-xylyl-N-methylcarbamate
4-(Methyl-β-chlorallylamino)-3,5-xylyl-N-methylcarbamate
1-(β-Aethoxycarbonylethyl)-3-methyl-5-pyrazolyl-N,N-dimethylcarbamate
3-Methyl-4-(dimethylamino-methylmercapto-methylenimino)phenyl-N-methylcarbamate
1,3-Bis(carbamoylthio)-2-(N,N-dimethylamino)-propanhydrochloride
5,5-Dimethylhydroresorcinoldimethylcarbamate
2-[Ethylpropargylamino]-phenyl-N-methylcarbamate
2-[Methylpropargylamino]-phenyl-N-methylcarbamate
2-[Dipropargylamino]-phenyl-N-methylcarbamate
4-[Dipropargylamino]-3-tolyl-N-methylcarbamate
4-[Dipropargylamino]-3,5-xylyl-N-methylcarbamate 2-[Allyl-isopropylamino]-phenyl-N-methylcarbamate
3-[Allyl-isopropylamino]-phenyl-N-methylcarbamate Chlorinated Hydrocarbons γ-hexachlorocyclohexane [GAMMEXANE; LINDAN; γ HCH]
1,2,3,4,5,6,7,8,8-octachloro-3α,4,7,7α'tetrahydro-4,7-methylenindane [CHLORDAN]
1,4,5,6,7,8,8-heptachloro,3α,4,7,7α-tetrahydro-4,7-methylenindane [HEPTACHLOR]
1,2,3,4,10,10-hexachloro-1,4,4α,5,8,8α-hexahydro-endo-1,4-exo-5,8-dimethanonaphthalene [ALDRIN]
1,2,3,4,10,10-hexachloro-6,7-epoxy-1,4,4α,5,6,7,8,8α-octahydroexo-1,4-endo-5,6-dimethanonaphthalene [DIELDRIN]
1,2,3,4,10,10-hexachloro-6,7-epoxy-1,4,4α,5,6,7,8,8α-octahydroendo-endo-5,8-dimethanonaphtalene [ENDRIN].

The compounds of the formula I likewise have fungicidal activity against phytopathogenic moulds on various culture plants such as wheat, maize, rice, vegetables, ornamental plants, fruit trees, vines, field fruits, etc.

With the new active substances, fungi arising on fruits, blooms, leaves, branches, tubers and roots can be restricted or eliminated, by which even later growing plant parts remain protected against such fungi. The active substances of formula I are particularly effective against phytopathogenic fungi belonging to the following classes: Oomycetes, Zygomycetes, Ascomycetes, Basidiomycetes, Denteromycetes.

The active substances according to the invention can also be used for treating seed grain, fruit, tubers, etc. for protecting them from fungus infections, for example from smut fungi of all kinds, such as: Ustilaginales, e.g. Ustilago, Tilletia, Urocystis, Tuburcinia and Phoma types.

In addition to the cited insecticides and acaricides, the compounds of the formula I may also be formulated, in order to broaden the activity spectrum, with bactericides, fungistatic or bacteriostatic agents, nematocides and/or for example the following fungicides:
dodecylquanidine acetate (DODINE)
pentachloronitrobenzene (QUINTOZENE)
pentachlorophenol (PCP)
2-(1-methyl-n-propyl)-4,6-dinitrophenyl-2-methyl-crotonate (BINAPACRYL)
2-(1-methyl-n-heptyl)-4,6-dinitrophenylcrotonate (DINOCAP)
2,6-dichloro-4-nitroaniline (DICHLORAN)
2,3,5,6-tetrachloro-benzoquinone (1,4) (CHLORANIL)
2,3-dichloro-naphthoquinone (1,4) (DICHLONE)
N-(trichloromethylthio) phthalimide (FOLPAT)
N-(trichloromethylthio) cyclohex-4-en-1,2-dicarboximide (CAPTAN)
N-(1,1,2,2-tetrachloroethylthio) cyclohex-4-en-1,2-dicarboximide (CAPTAFOL)
N-methansulfonal-N-trichloromethylthio-chloroaniline
N'-dichlorofluoromethylthio-N,N-dimethyl-N'-phenyl-sulfamide (DICHLOFLUANID)
O-ethyl-S-benzyl-phenyldithiophosphate
O,O-diethyl-S-benzyl-thiolphosphate
disodium-ethylene-1,2-bis-dithiocarbamate (NABAM)
zinc-ethylene-1,2-bis-dithiocarbamate (ZINEB)
manganese-ethylene-1,2-bis-dithiocarbamate (polymeric) (MANEB)
tetramethylthiuramdisulfide (THIRAM)
1-oxy-3-acetyl-6-methyl-cyclohexene-(5)dione-(2,4 (DEHYDROACETIC ACID)
8-hydroxyquinoline (8-QUINOLINOL)
2-dimethylamino-6-methyl-5-n-butyl-4-hydroxy-pyrimidine
methyl-N-benzimidazole-2-yl-N-(butylcarbamoyl)carbamate (BENOMYL)
2-ethylamino-6-methyl-5n-butyl-4-hydroxypyrimidine
2,3-dicyano-1,4-dithia-anthraquinone (DITHIANON)
2-(4-thiazolyl)-benzimidazole
3,5-dimethyltetrahydro-1,3,5-thiadiazine-2-thione (DAZOMET)
2,3-dihydro-5-carboxanilido-6-methyl-1,4-oxathine
pentachlorobenzyl alcohol.

Additionally, the new compounds of formula I have nematocidal properties and can be used, for example, for combating plant parasitic nematodes.

The compounds of formula I can be used alone or together with suitable carriers and/or additives. Suitable carriers or additives can be solid or liquid and correspond to materials customarily used in formulation technique such as e.g. natural or regenerated materials, solvents, dispersing agents, wetting agents, adhesives, thickeners, binders and/or fertilisers.

For application the compounds of formula I can be processed by means of generally known techniques to dusts, emulsion concentrates, granules, dispersions, sprays, solutions or suspension in the usual way. Cattle dips and spray races, in which aqueous preparations are used should also be mentioned.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms dusts, tracking agents, granules, coated granules, impregnated granules and homogeneous granules.

Liquid forms a. active substance concentrates which are dispersible in water: wettable powders, pastes, emulsions;
b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, mangesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc, each used alone or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk densitiy of 300 g/litre to 600 g/litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenyl and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleyl methyl tauride, ditertiary ethylene glycols, dialkyl dilauryl ammonium chloride and fatty acid alkali and alkaline earth metal salts.

Suitable anti-foam agents are silicone oils.

The active substances are so mixed, ground, sieved and strained with the additives mentioned above that, in wettable powders, the solid particle size of from 0.02 to 0.04 and in pastes, of 0.03 mm is not exceeded. To produce emulsifiable concentrates and pastes, dispersing agents such as those given in the previous paragraphs, organic solvents and water are used. Examples of suitable solvents are the following: alcohols, benzene, xylene, toluene, dimethyl sulfoxide, and mineral oil fractions boiling between 120° and 350°C. The solvents must be practically odorless, not phytotoxic, and inert to the active substances.

Furthermore, the agents according to the invention can be applied in the form of solutions. For this purpose the active substance or several active substances of general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula I can, for example, be formulated as follows:

Dusts

The following substances are used to manufacture (a) a 5% and (b) a 2% dust:

a. 5 parts of active substance
   95 parts of talcum
b. 2 parts of active substance
   1 part of highly disperse silicic acid
   97 parts of talcum.

The active substances are mixed with the carriers and ground.

Granules

The following substances are used to manufacture 5% granules:

5 parts of active substance
0.25 part of epichlorohydrin
0.25 part of cetyl polyglycol ether
3.50 parts of polyethylene glycol
91 parts of kaolin (particle size = 0.3–0.8 mm).

The active substance is mixed with epichlorohydrin and the mixture dissolved with 6 parts of acetone, then polyethylene glycol and cetyl polyglycol ether are added. The resulting solution is sprayed on kaolin and the acetone is subsequently evaporated in vacuo.

Wettable Powder

The following constituents are used to manufacture an (a) 40%, (b) and (c) 25% and (d) 10% wettable powder:

a. 40 parts of active substance
   5 parts of sodium lignin sulphonate
   1 part of sodium dibutylnaphthalenesulphonic acid
   54 parts of silicic acid
b. 25 parts of active substance
   4.5 parts of calcium lignin sulphonate
   1.9 parts of Champagne chalk/hydroxyethyl cellulose mixture (1:1)
   1.5 parts of sodium dibutylnaphthalenesulphonate
   19.5 parts of silicic acid 19.5 parts of Champagne chalk
28.1 parts of kaolin;
c. 25 parts of active substance
2.5 parts of isooctylphenoxy-polyoxyethylene ethanol
1.7 parts of Champagne chalk/hydroxyethyl cellulose mixture (1:1)
8.3 parts of sodium aluminium silicate
16.5 parts of kieselguhr
46 parts of kaolin;
d. 10 parts of active substance
3 parts of mixture of sodium salt of saturated fatty alcohol sulphates
5 parts of naphthalenesulphonic acid/formaldehyde condensate
82 parts of kaolin.

The active substances are intimately mixed in appropriate mixing device with the adjuvants and ground in corresponding mills and rollers. Wettable powder are obtained which can be diluted with water to suspensions of every desired concentration.

Emulsifiable Concentrates

The following substances are used to manufacture (a) a 10% and (b) a 25% emulsifiable concentrate:
a. 10 parts of active substance
3.4 parts of epoxidised vegetable oil
13.4 parts of a combination emulsifier consisting of fatty alcohol polyglycol ether and calcium alkylarylsulphonate
40 parts of dimethyl formamide
43.2 parts of xylene;
b. 25 parts of active substance
2.5 parts of epoxidised vegetable oil
10 parts of an alkylarylsulphonate/fatty alcohol polyglycol ether mixture
5 parts of dimethyl formamide
57.5 parts of xylene.

Emulsion of every desired concentration can be manufactured by diluting these concentrates with water.

Sprays

The following constituents are used to manufacture a 5% spray:
5 parts of active substance
1 part of epichlorohydrin
94 parts of petrol (boiling range 160°–190°C)

The following Examples illustrate the preparation of compounds and their biocidal activity:

EXAMPLE 1

S-[2-oxo-3-methylene-5-chlorobenzoxazole]-O-ethyl-S-n-propyldithiophosphoric acid ester.

A mixture of 31.7 g N-chloromethyl-5-chlorobenzoxazole (m.pt. 120°C) and 40 g of the potassium salt of O-ethyl-S-n-propyldithiophosphate in 200 ml acetone was stirred for 1 hour at room temperature and then for 5 hours at 55°C. After cooling, the reaction mixture was treated with 500 ml ice water. The separated oil was dissolved in 200 ml benzene, and the benzenic solution then washed with water, a 3% sodium carbonate solution and again with water. After drying the benzenic solution over sodium sulphate, distilling off the solvent and molecular distillation of the thick fluid oil, an active substance of the formula

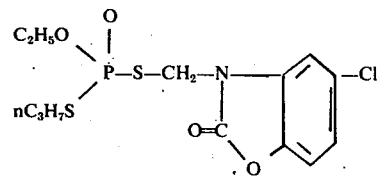

$n_D^{25}$:1.576; molecular distillation 140°C/0.001 torr.
Analysis: for $C_{13}H_{17}CLNO_4PS_2$

|     | calc. | found |
|-----|-------|-------|
| %P  | 8.1   | 8.3   |
| %Cl | 9.3   | 9.0   |

The following compounds were made in analogous fashion:

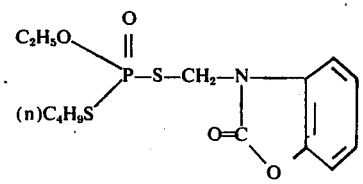

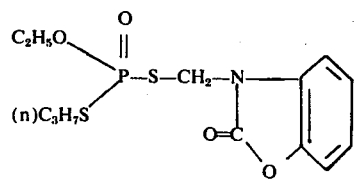

$n_D^{25} = 1,566$

B.pt. 135°C /0,001 Torr

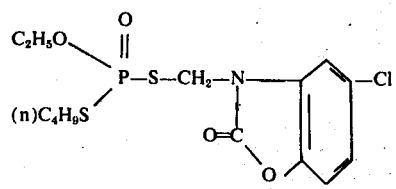

$n_D^{25} = 1,564$

B.pt. 150°C /0,001 Torr

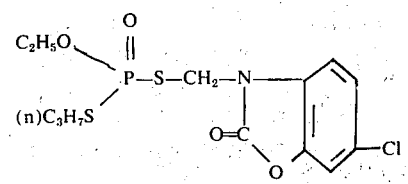
$n_D^{25} = 1.576$
B.pt. 140°C /0.001 Torr
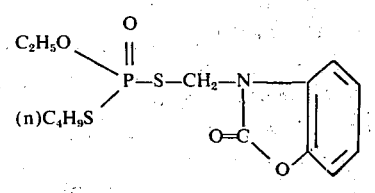
$n_D^{25} = 1.564$
B.pt. 150°C /0.001 Torr
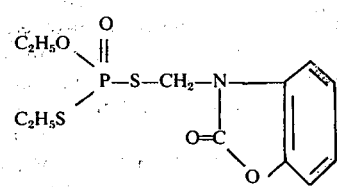
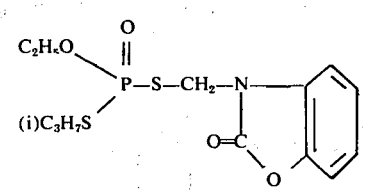
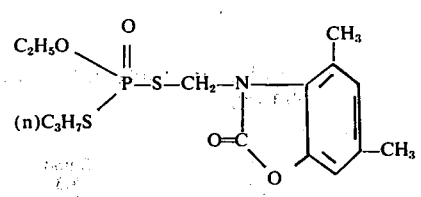
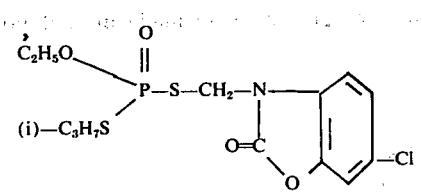
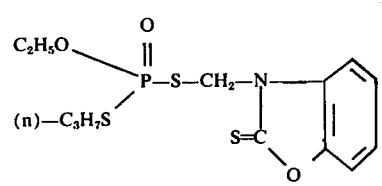
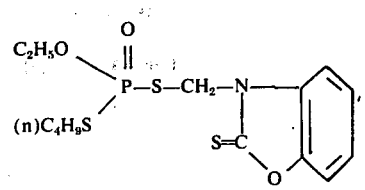
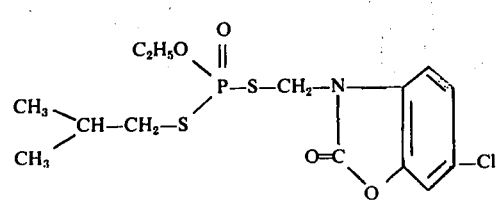

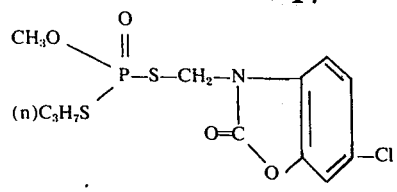 $n_D^{27} = 1,5865$
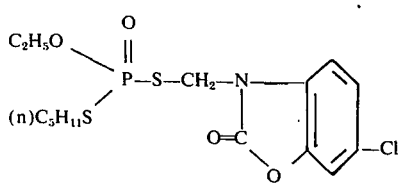 $n_D^{26} = 1,5589$
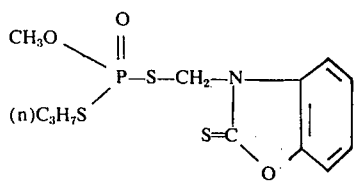 $n_D^{25,5} = 1,5725$
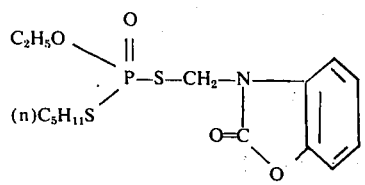 $n_D^{26} = 1,5548$
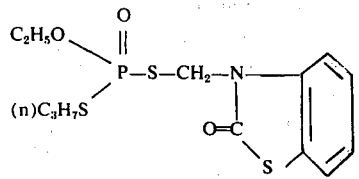 $n_D^{25} = 1,5925$
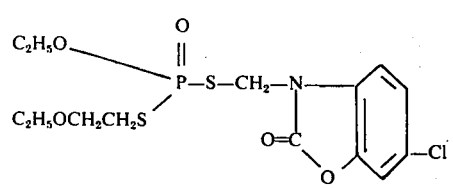 $n_D^{23,5} = 1,5674$
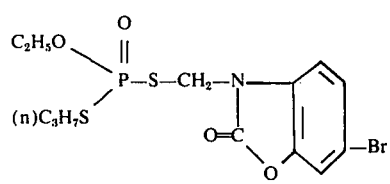 $n_D^{27} = 1,5840$
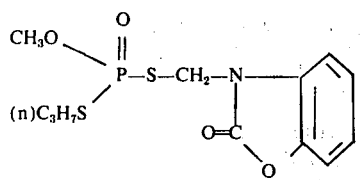 $n_D^{25} = 1,5732$

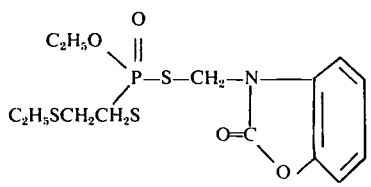

$n_D^{25} = 1.5895$

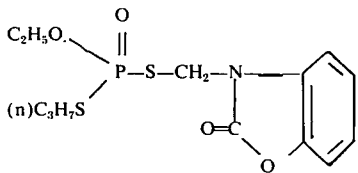

$n_D^{25} = 1.5931$

EXAMPLE 2

A. Insecticidal ingest poison action

Tobacco and potato plants are sprayed with a 0.05% aqueous emulsion (obtained from a 10% emulsifiable concentrate).

After the coating has dried, Egyptian cotton leaf worms (*Spodoptera literalis*) are settled on the tobacco plants and Colarado potato beetle larvae (*Lepinotarsa decemlineata*) on the potato plants. The test is carried out at 24°C and 60% relative humidity.

The compounds according to Example i have an ingest poison action against *Spodoptera litoralis* and *Lepinotarsa decemlineata*.

B. Systemic insecticidal action

To determine the systemic action, rooted bean plants (*Vicia fabae*) are put into a 0.01% aqueous active substance solution (obtained from a 10% emulsifiable concentrate). After 24 hours, aphids (*Aphis fabae*) are placed on the parts of the plant above the soil. The aphids are protected from contact and gas action by means of a special device. The test is carried out at 24°C and 70% relative humidity. In the above test the compounds according to Example I displayed a systemic action against *Aphis fabae*.

EXAMPLE 3

Action against Chilo suppressalis

Six rice plants at a time of the variety Caloro were transplanted into plastic pots (diameter at the top = 17 cm) and reared to a height of about 60 cm. Infestation with *Chilo suppressalis* larvae ($L_1$; 3-4 mm long) took place 2 days after application of the active substance in granule form to the paddy water (rate of application: 8 kg of active substance per hectare). Evaluation of the insecticidal action took place 10 days after application of the granules.

The compounds according to Example I were active in the above test against *Chilo suppressalis*.

EXAMPLE 4

Sterilised compost earth was homogeneously mixed with a wettable powder containing 25% of active substance so that there resulted a rate of application of 8 kg of active substance per hectare.

Young zucchetti plants (*Cucumis pepo*) were put into plastic pots with the treated soil (three plants per pot; diameter of pot = 7 cm). Each pot was infected immediately afterwards with 5 *Aulacophora femoralis* and Pachmoda or Chortiphila larvae. The control was carried out 4, 8, 16 and 32 days after depositing the larvae.

At 80–100% kill after the first control, a fresh infestation with 5 larvae each was carried out in the same soil sample with 3 new succhetti plants. If the activity was less than 80%, the remaining larvae remained in the soil sample until the control immediately following. If an active substance at a rate of application of 8 kg/ha still effected a 100% kill, a further control with 4 and 2 kg of active substance per hectare was carried out.

In the above test, the compounds according to Example I displayed action against *Aulacophora femoralis*, Pachmoda and Chortiphila larvae.

EXAMPLE 5

Action against ticks

A. *Rhicephalus bursa*

In each of two test series 5 adult ticks and 50 tick larvae are counted into a glass tube and immersed for 1 to 2 minutes in 2 ml of an aqueous amulsion from an emulsion series each containing 100, 10, 1 and 0.1 ppm of test substance. The tube is then sealed with a standardised cotton wool plug and placed on its head, so that the active substance amulsion can be adsorbed by the cotton wool.

In the case of the adults evaluation takes place after 2 weeks, and in that of the larvae after 2 days. Each test is repeated twice.

B. *Boophilus microplus* (larvae)

Tests are carried out in each case with 20 OP-sensitive larvae using an analogous dilution series as in the case of test A.

The compounds according to Example 1 act in these tests against adults and larvae of *Rhipicephalus bursa* and sensitive and O.P. resistant larvae of *Boophilus microplus*.

EXAMPLE 6

ACARACIDAL ACTION

*Phaseolus vulgaris* (dwarf beans) have an infested piece of leaf from a mass culture of *Tetranychus urticae* placed on them 12 hours before the test for the acaricidal action. The occupying mobile stages are sprayed with the emulsified test preparations from a chromatography atomiser so that the spray broth does not run off. The number of living and dead larvae, adults and eggs are evaluated after 7 days under a stereoscopic microscope and the result expressed in percentages.

During the "interim", the treated plants are kept in greenhouse compartments at 25°C.

The compounds according to Example I are active in the above test against eggs, larvae and adults of *Tetranychus urticae*.

EXAMPLE 7

Action against soil nematodes

To test the action against soil nematodes, the active substance (in the concentration indicated in each case is applied to and intimately mixed with soil infected with root gall nematodes (*Meloidgyne Avenaria*). Immediately afterwards, tomato cuttings are planted in the thus prepared soil in a series of tests and after a waiting time of 8 days tomato seeds are sown in another test series.

In order to assess the nematocidal action, the galls present on the roots are counted 28 days after planting and sowing respectively. The compounds according to Example I display good action against *Meloidgyne Avenaria* in this test.

EXAMPLE 8

Fungicidal Action a. Action against *Piricularia oryzae* Bri. et Cav.

Protective action

Rice plants are cultivated in a greenhouse and sprayed once with an aqueous spray broth containing 0.05% of active substance. Two days later the so treated plants are infected with conidia of *Piricularia oryzae* Bri. et Cav. and examined for attack by fungus after a 5 day incubation period in a humid chamber.
Curative action Rice plants which have been infected with conidia of *Piricularia oryzae* Bri. et Cav. were cultivated in a greenhouse. Two days after the infection, the plants were sprayed with an aqueous spray broth containing 0.05% of active substance.

The plants were examined for attack by fungus after a 5 day incubation period in a humid chamber.

b. Action against *Phytophthora infestans* on *Solanum Lycopersicum*

*S. Lycopersicum* plants of the same variety and in the same development stage were treated with a broth of 0.05% active substance (prepared from the active substance formulated as a wettable powder). After the coating layer had dried, the dry plants were sprayed dripping wet with a zoospore suspension of *Ph. Infestans*. They were then kept for 6 days in a greenhouse at 18°–20°C and high humidity (95–100%), after which time they displayed typical leaf specks. The evaluation of the tested substance was based on their number and size.

The compounds according to Example I displayed good fungicidal action in the above tests (a) and (b).

What we claim is:

1. A compound of the formula

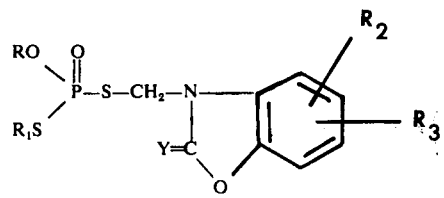

wherein
R is methyl or ethyl,
$R_1$ is n-pentyl or ethoxyethyl,
each of $R_2$ and $R_3$ is hydrogen or halogen, and
Y is oxygen or sulphur.

2. The compound according to claim 1 of the formula

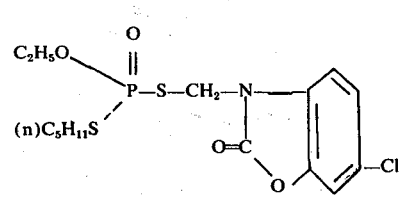

3. The compound according to claim 1 of the formula

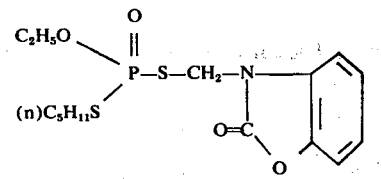

4. The compound according to claim 1 of the formula

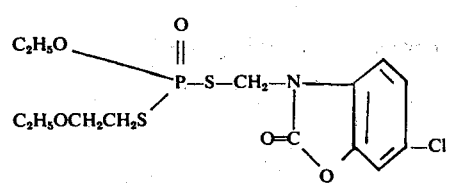

5. A compound of the formula

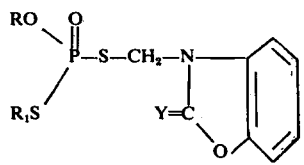

wherein
R is methyl or ethyl,
$R_1$ is propyl, butyl, n-pentyl, ethoxyethyl or ethylthioethyl, and
Y is oxygen or sulphur.

6. The compound according to claim 5 of the formula

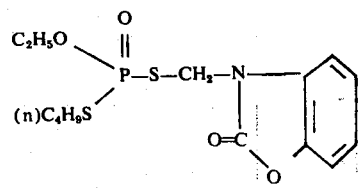

7. The compound according to claim 5 of the formula
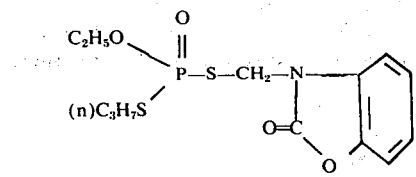
8. The compound of the formula
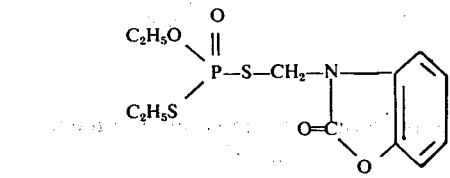
9. The compound according to claim 5 of the formula
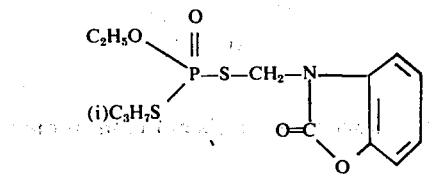
10. The compound according to claim 5 of the formula
11. The compound according to claim 5 of the formula
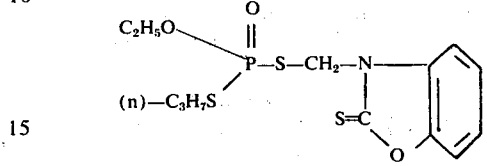
12. The compound according to claim 5 of the formula
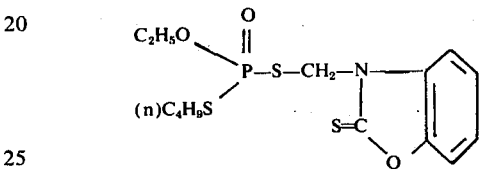
13. The compound according to claim 5 of the formula
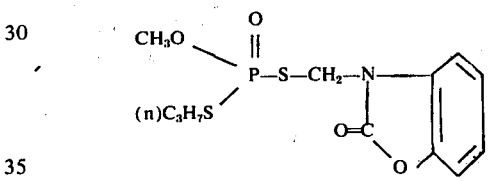
* * * * *